US008341418B2

(12) United States Patent
Yoshimura

(10) Patent No.: US 8,341,418 B2
(45) Date of Patent: Dec. 25, 2012

(54) ELECTRONIC MAIL TRANSMISSION AND RECEPTION SYSTEM

(75) Inventor: Shin Yoshimura, Tokyo (JP)

(73) Assignee: Shin Yoshimura, Tokyo (JP)

( * ) Notice: Subject to any disclaimer, the term of this patent is extended or adjusted under 35 U.S.C. 154(b) by 756 days.

(21) Appl. No.: 12/312,066

(22) PCT Filed: Oct. 23, 2007

(86) PCT No.: PCT/JP2007/070611
§ 371 (c)(1), (2), (4) Date: Apr. 24, 2009

(87) PCT Pub. No.: WO2008/050742
PCT Pub. Date: May 2, 2008

(65) Prior Publication Data

US 2009/0307760 A1 Dec. 10, 2009

(30) Foreign Application Priority Data

Oct. 25, 2006 (JP) ................................ 2006-290046

(51) Int. Cl.
*G06F 21/00* (2006.01)
*G06F 15/16* (2006.01)

(52) U.S. Cl. .............. 713/181; 726/4; 726/26; 709/206; 709/217

(58) Field of Classification Search ........................ None
See application file for complete search history.

(56) References Cited

U.S. PATENT DOCUMENTS 6,839,741 B1 * 1/2005 Tsai .............................. 709/217
2002/0016823 A1 * 2/2002 Ueno et al. .................... 709/206
2002/0026481 A1 * 2/2002 Mori et al. .................... 709/206
2004/0186851 A1 * 9/2004 Jhingan et al. ............. 707/104.1
2005/0060373 A1 * 3/2005 Ban .............................. 709/206
2005/0097569 A1 * 5/2005 Chandrasekaran ........... 719/318
2006/0005247 A1 * 1/2006 Zhang et al. .................... 726/26
2008/0289037 A1 * 11/2008 Marman et al. ................. 726/22
2009/0251738 A1 * 10/2009 Nakahara ...................... 358/448
2011/0006881 A1 * 1/2011 Hogaboom et al. ......... 340/5.83

FOREIGN PATENT DOCUMENTS

JP 2000-092112 3/2000
JP 2003-333099 11/2003
JP 2004-500761 1/2004
JP 2004-102717 4/2004
JP 2006-119738 5/2006

* cited by examiner

*Primary Examiner* — Philip Chea
*Assistant Examiner* — Dorianne Alvarado David
(74) *Attorney, Agent, or Firm* — Clark & Brody

(57) ABSTRACT

An electronic mail transmission/reception system is provided, capable of maintaining the confidentiality of restricted attachments desired to be limited in destination, thereby ensuring the security of the restricted attachments. A system management server 11 of an electronic mail transmission/reception system 10 includes: first conversion means for hashing a restricted attachment intended for a predetermined destination by a one-way hash function, and converting the restricted attachment into a first hash output value; first storage means for storing the first hash output value for the restricted attachment converted via the first conversion means; second conversion means for hashing a received attachment by the one-way hash function, and converting the attachment into a second hash output value; and destination restriction means for comparing the first hash output value with the second hash output value, and when these hash output values are equal, transmitting the attachment corresponding to the second hash output value only to the predetermined destination.

15 Claims, 8 Drawing Sheets

CLIENT TERMINAL DEVICE 19
20 MAIL SERVER 13
MAIL BOX 21
EXTERNAL SERVER
12
CLIENT TERMINAL DEVICE
10
15
MAIL SERVER 11
MAIL BOX MAIL BODY 17
INTERNET 14
12
CLIENT TERMINAL DEVICE
16 WEB SERVER
MAIL BOX ATTACHMENT 18
SYSTEM MANAGEMENT SERVER
21 MAIL BOX
MAIL SERVER 20
13 EXTERNAL SERVER
CLIENT TERMINAL DEVICE 19

10
11
SYSTEM MANAGEMENT SERVER
15
MAIL SERVER
16
WEB SERVER
17
MAIL BOX
MAIL BODY
18
MAIL BOX
ATTACHMENT
14
INTERNET
13
EXTERNAL SERVER
20
MAIL SERVER
21
MAIL BOX
19
CLIENT TERMINAL
DEVICE
12
CLIENT TERMINAL
DEVICE 10
11
17
18
MAIL BOX
MAIL BODY
MAIL BOX
ATTACHMENT
MAIL SERVER
WEB SERVER
SYSTEM MANAGEMENT SERVER
15
16
12
14
INTERNET
CLIENT TERMINAL
DEVICE
MAIL SENDER
CLIENT TERMINAL
DEVICE
MAIL RECIPIENT
19
20
MAIL SERVER
13
MAIL BOX
EXTERNAL SERVER
21

10
11
MAIL SERVER
15
MAIL BOX
MAIL BODY
17
WEB SERVER
16
MAIL BOX
ATTACHMENT
18
SYSTEM MANAGEMENT SERVER
14
INTERNET
CLIENT TERMINAL
DEVICE
19
13
MAIL SERVER
20
MAIL BOX
21
EXTERNAL SERVER
CLIENT TERMINAL
DEVICE
12

10
11
SYSTEM MANAGEMENT SERVER
15
MAIL SERVER
16
WEB SERVER
17
MAIL BOX
MAIL BODY
18
MAIL BOX
ATTACHMENT
14
INTERNET
13
EXTERNAL SERVER
20
MAIL SERVER
21
MAIL BOX
19
CLIENT TERMINAL
DEVICE
12
CLIENT TERMINAL
DEVICE 10
11
15
MAIL SERVER
17
MAIL BOX
MAIL BODY
18
MAIL BOX
ATTACHMENT
WEB SERVER
16
SYSTEM MANAGEMENT SERVER
14
INTERNET
12
CLIENT TERMINAL
DEVICE
MAIL SENDER
CLIENT TERMINAL
DEVICE
MAIL RECIPIENT
19
13
20
MAIL SERVER
MAIL BOX
21
EXTERNAL SERVER

CLIENT TERMINAL
DEVICE
19
20
MAIL SERVER
13
MAIL BOX
21
EXTERNAL SERVER
12
CLIENT TERMINAL
DEVICE
12
CLIENT TERMINAL
DEVICE
INTERNET
14
10
15
MAIL SERVER
11
MAIL BOX
MAIL BODY
17
16
WEB SERVER
MAIL BOX
ATTACHMENT
18
SYSTEM MANAGEMENT SERVER
21
MAIL BOX
MAIL SERVER
20
13
EXTERNAL SERVER
CLIENT TERMINAL
DEVICE
19

10
11
17
18
15
16
12
14
13
20
21
19
MAIL SERVER
MAIL BOX
MAIL BODY
MAIL BOX
ATTACHMENT
WEB SERVER
SYSTEM MANAGEMENT SERVER
INTERNET
CLIENT TERMINAL
DEVICE
MAIL SENDER
CLIENT TERMINAL
DEVICE
MAIL RECIPIENT
MAIL SERVER
MAIL BOX
EXTERNAL SERVER

ELECTRONIC MAIL TRANSMISSION AND RECEPTION SYSTEM

TECHNICAL FIELD

The present invention relates to electronic mail transmission/reception systems including a server device capable of transmitting/receiving electronic mail via a network.

BACKGROUND ART

There is an electronic mail transmission/reception system composed of a mail server and a plurality of client terminal devices connected to the mail server, in which the mail server stores the mail bodies of electronic mail transmitted from the client terminal devices, independently of attachments, and when the mail server is requested by any client terminal device to transfer an attachment, the mail server transfers the attachment to the client terminal device (see Patent Document 1). The mail server counts the number of requests for an attachment per predetermined period of time based on requests by the client terminal devices to transfer the attachment, and when the counted number of requests is equal to or greater than a predetermined value, generates and stores replicated data for the attachment. Upon reception of a request by any client terminal device to transfer the attachment, the mail server transfers the attachment or the replicated data to the client terminal device. In this electronic mail transmission/reception system, the mail server generates replicated data for attachments only when attachment transfer requests are concentrated within a short period of time, and therefore the mail server's memory space does not decrease significantly, so that concentration of attachment transfer requests can be avoided.

Patent Document 1: Japanese Laid-Open Patent Publication No. 2003-333099

DISCLOSURE OF INVENTION

Problem to be Solved by the Invention

In electronic mail transmission/reception systems, typically, when a mail sender, which sends information via electronic mail, transmits electronic mail to a predetermined destination, the electronic mail is received by a mail server connected to a client terminal device of a mail recipient, and when the mail recipient requests via the client terminal device that the electronic mail be transferred, the electronic mail is transferred from the mail server to the client terminal device. In such a system, all attachments are transmitted to mail recipient-side mail servers without distinguishing highly confidential, restricted attachments desired to be limited in destination from other attachments, and therefore the confidentiality of the restricted attachments is not maintained, failing to ensure the security of the restricted attachments. In addition, when an attachment with the same contents is transmitted from a mail sender more than once, such attachments with the same contents are all transmitted to mail recipient-side mail servers, and therefore a plurality of attachments with the same contents are unnecessarily stored in the mail servers.

Also, in the case of the electronic mail transmission/reception system disclosed in the aforementioned publication, when a plurality of attachments, along with mail bodies, are transmitted in a concentrated manner within a short period of time from the mail server of the mail sender, which sends information via electronic mail, to the system-side mail server, the attachments are stored to the mail server. In this system, even when the mail server generates no replicated data for attachments, attachments transmitted from the mail sender-side mail server are stored to mail recipient-side mail servers, and that alone might cause overflow in the memory space of the mail servers. In particular, attachments contain not only text data and/or graphic data but also data that uses a larger portion of the memory space, such as image data, video data, and/or audio data, and therefore if the mail server stores a plurality of attachments at a time, the memory space of the mail server decreases significantly.

An objective of the present invention is to provide an electronic mail transmission/reception system capable of maintaining the confidentiality of restricted attachments desired to be limited in destination, thereby ensuring the security of the restricted attachments. Another objective of the present invention is to provide an electronic mail transmission/reception system capable of preventing attachments with the same contents from being transmitted unnecessarily, thereby preventing overflow in the memory space of a server device due to storage of a plurality of attachments.

Means for Solving Problem

The basis of the present invention to solve the above problems is formed by an electronic mail transmission/reception system comprising a first server device capable of transmitting/receiving via a network electronic mail composed of a mail body and an attachment added to the mail body.

On the above basis, the present invention is characterized in that the first server device includes: first conversion means for hashing a restricted attachment intended for a predetermined destination by a one-way hash function, and converting the restricted attachment into a first hash output value; first storage means for storing the first hash output value for the restricted attachment converted via the first conversion means; second conversion means for hashing a received attachment by the one-way hash function, and converting the attachment into a second hash output value; and destination restriction means for comparing the first hash output value with the second hash output value, and when these hash output values are equal, transmitting the attachment corresponding to the second hash output value only to the predetermined destination.

In an example of the present invention, the first server device includes: second storage means for storing the second hash output value for the attachment converted via the second conversion means; and transmission rejection means for sequentially comparing the second hash output value stored via the second storage means to the second hash output value for the attachment converted via the second conversion means, and when these hash output values are equal, refusing transmission of any subsequent attachment corresponding to the second hash output value.

In another example of the present invention, the first server device includes: electronic mail separation means for separating the received electronic mail into the mail body and the attachment; third storage means for independently storing the mail body and the attachment separated via the electronic mail separation means; code generation means for generating a transmission request code for use by a predetermined client terminal device to request the first server device to transmit the attachment; and code appending means for appending to the mail body the transmission request code for the attachment corresponding to the mail body. In this electronic mail transmission/reception system, the client terminal device uses the transmission request code to request the first server device to transmit the attachment, so that the first server device transmits to the client terminal device the attachment corresponding to the transmission request code.

In another example of the present invention, the electronic mail transmission/reception system includes a second server device capable of transmitting/receiving electronic mail to/from the first server device via the network, and the first server device includes mail body transmission means for transmitting to the second server device the mail body having the transmission request code appended thereto. In this electronic mail transmission/reception system, the client terminal device connected to the second server device uses the transmission request code to request the first server device to transmit the attachment, so that the first server device transmits the attachment corresponding to the transmission request code to the client terminal device connected to the second server device.

In another example of the present invention, the code generation means appends to the generated transmission request code a portion of the second hash output value for the attachment corresponding to the transmission request code.

In another example of the present invention, the first server device erases the stored second hash output value and the stored attachment after a predetermined period of time since their storage.

In another example of the present invention, the first server device, when requested by the client terminal device to transmit the attachment, requests the client terminal device to perform an authorization procedure for authorizing transmission of the attachment.

Effect of the Invention

In the electronic mail transmission/reception system according to the present invention, by comparing a first hash output value for a restricted attachment intended for a predetermined destination with a second hash output value for a received attachment, it is possible to determine whether or not the restricted attachment and the transmitted attachment are identical. In the electronic mail transmission/reception system, when the first hash output value and the second hash output value are equal, the attachment corresponding to the second hash output value is transmitted only to the predetermined destination, and therefore highly confidential, restricted attachments desired to be limited in destination are not transmitted to any destination other than their predetermined destinations, making it possible to maintain the confidentiality of the restricted attachments, thereby ensuring the security of the restricted attachments. In this electronic mail transmission/reception system, the administrator is able to freely render any attachment a restricted attachment, and freely set the destination of each restricted attachment based on its contents, type, and so on.

In the electronic mail transmission/reception system, where a second hash output value for a transmitted attachment is sequentially compared with a stored second hash output value, and when these hash output values are equal, transmission of any subsequent attachment corresponding to the second hash output value is rejected, by comparing these second hash output values, it is possible to determine the identity of any transmitted attachment. In this electronic mail transmission/reception system, even when a mail sender happens to transmit an attachment with the same contents more than once, transmission of any subsequent attachment with the same contents is rejected, and therefore it is possible to prevent in advance any unnecessary attachment from being transmitted, thereby preventing overflow in the memory space of the server device due to storage of unnecessary attachments with the same contents.

In the electronic mail transmission/reception system, where received electronic mail is separated so that a mail body and an attachment are stored separately, and a transmission request code generated for the attachment is appended to the mail body, the separation between the mail body and the attachment makes it possible to reliably limit restricted attachments in destination, thereby reliably preventing the restricted attachments from being transmitted to any destination other than their predetermined destinations. In this electronic mail transmission/reception system, the separation between the mail body and the attachment makes it possible to reject transmission of any attachments with the same contents, thereby reliably preventing transmission of any subsequent attachment with the same contents. In this electronic mail transmission/reception system, when a predetermined client terminal device uses a transmission request code to request attachment transmission of the first server device, the first server device transmits to the client terminal device an attachment corresponding to the transmission request code, making it possible to reliably transmit the attachment to the client terminal device.

In the electronic mail transmission/reception system, where the first server device transmits to the second server device a mail body having a transmission request code appended thereto, the first server device only transmits to the second server device the mail body of electronic mail having a transmission request code appended thereto, and therefore even when the second server device receives electronic mail in a concentrated manner within a short period of time, the second server device's memory space does not decrease significantly, so that it is possible to reliably prevent overflow in the memory space of the second server device. In the electronic mail transmission/reception system, a mail body has appended thereto a transmission request code for an attachment corresponding thereto, and when the client terminal device connected to the second server device uses the transmission request code to request attachment transmission of the first server device, the first server device transmits to the client terminal device an attachment corresponding to the transmission request code, so that it is possible to reliably transmit not only the mail body but also the attachment to the client terminal device. In this electronic mail transmission/reception system, the second server device only transfers the mail body, excluding the attachment, to the client terminal device, and therefore it is possible to significantly shorten the transfer time as compared to the case where the second server device transfers to the client terminal device electronic mail including attachments.

In the electronic mail transmission/reception system, where a portion of the second hash output value for an attachment corresponding to a generated transmission request code is appended to the transmission request code, it is possible to make it difficult for any third party to decipher or copy a transmission request code generated via the code generation means, thereby preventing unauthorized acquisition of attachments by any third party. In this electronic mail transmission/reception system, a portion of the second hash output value for a restricted attachment is appended to transmission request codes corresponding to attachments identical to the attachment, and therefore it is possible to make it difficult for any third party to decipher or copy a transmission request code appended to any attachment identical to a restricted attachment, thereby reliably preventing unauthorized acquisition of restricted attachments by any third party.

In the electronic mail transmission/reception system, where the first server device erases stored second hash output values and attachments after a predetermined period of time, even when the first server device stores a plurality of second hash output values and attachments, the first server device sequentially erases the stored second hash output values after a predetermined period of time since their storage, and sequentially erases the stored attachments as well after a predetermined period of time since their storage, and therefore it is possible to prevent overflow in the memory space of the first server device due to second hash output values and attachments. In this system, by erasing the attachments after a predetermined period of time since their storage, it becomes possible to lower the possibility of leaking highly confidential attachments, thereby reducing the risk of unauthorized acquisition of highly confidential attachments.

In the electronic mail transmission/reception system, where the first server device, when requested by a client terminal device to transmit an attachment, requests the client terminal device to perform the authorization procedure for authorizing transmission of the attachment, the attachment is transmitted only to any authorized client terminal device, and therefore it is possible to prevent the attachment from being viewed by any users other than legitimate system users who have been authorized. In this system, by causing the client terminal device to perform the authorization procedure, it becomes possible to lower the possibility of leaking highly confidential attachments, thereby reducing the risk of unauthorized acquisition of highly confidential attachments.

EXPLANATIONS OF LETTERS OR NUMERALS

Figure 1:
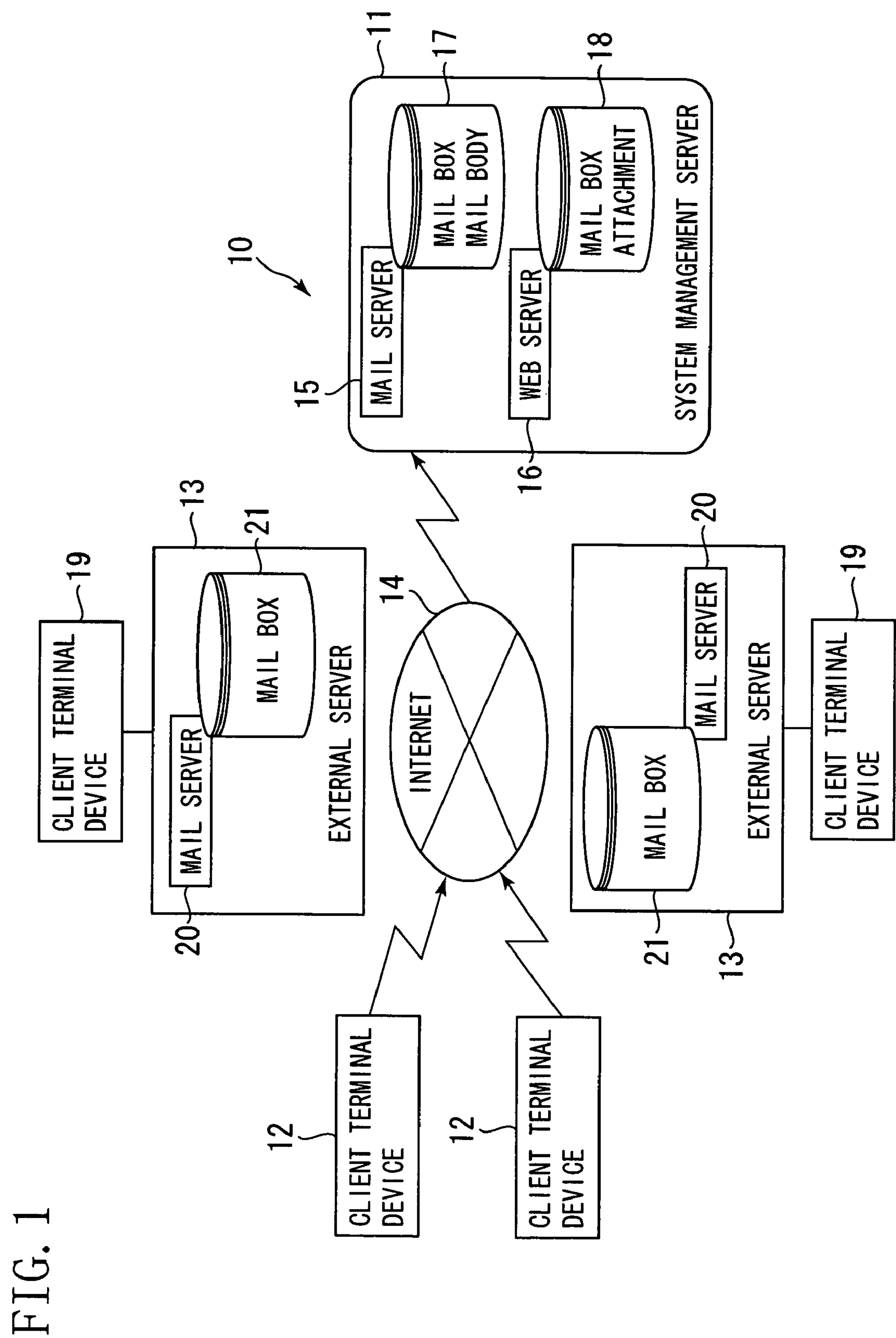
FIG. 1 is a configuration diagram of an electronic mail transmission/reception system, which is illustrated by way of example.

10 electronic mail transmission/reception system
11 system management server (first server device)
12 client terminal device
13 external server (second server device)
14 Internet
15 mail server
16 web server
17 mail box
18 mail box
19 client terminal device
20 mail server
21 mail box

BEST MODE FOR CARRYING OUT THE INVENTION

Figure 2:
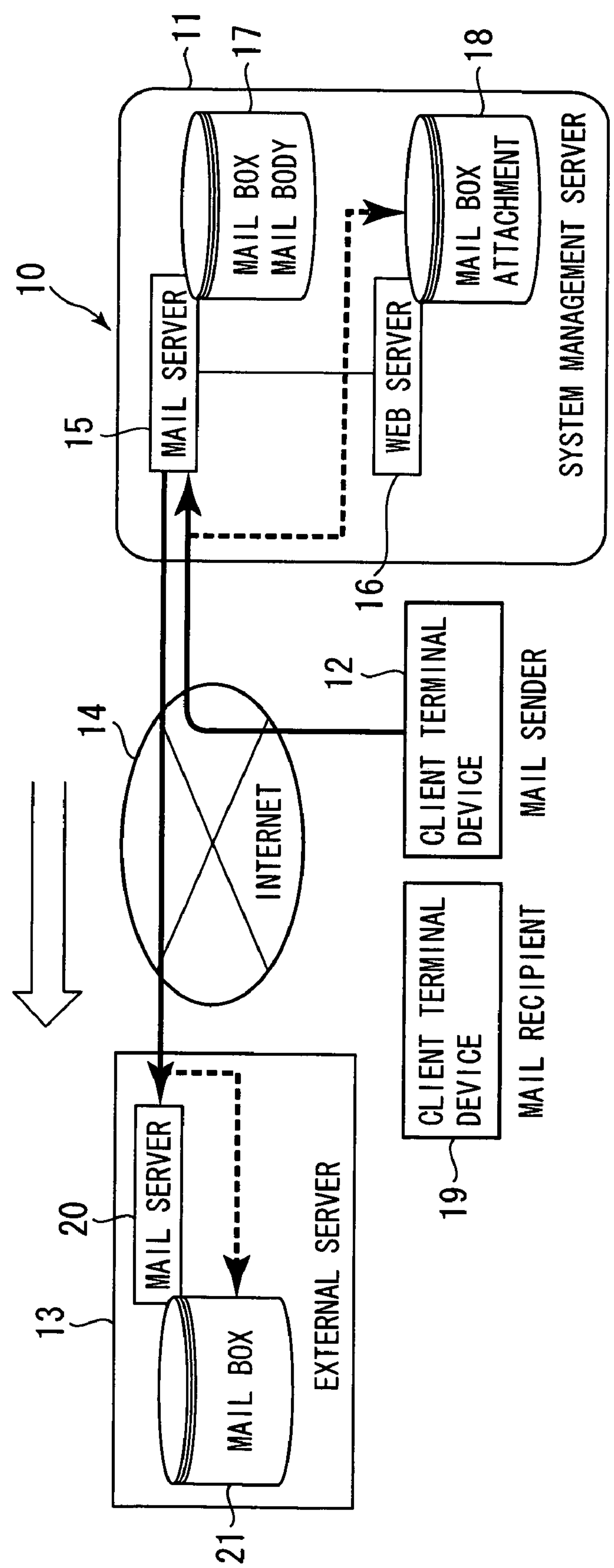
FIG. 2 is a diagram describing the details of electronic mail transmission.
Figure 3:
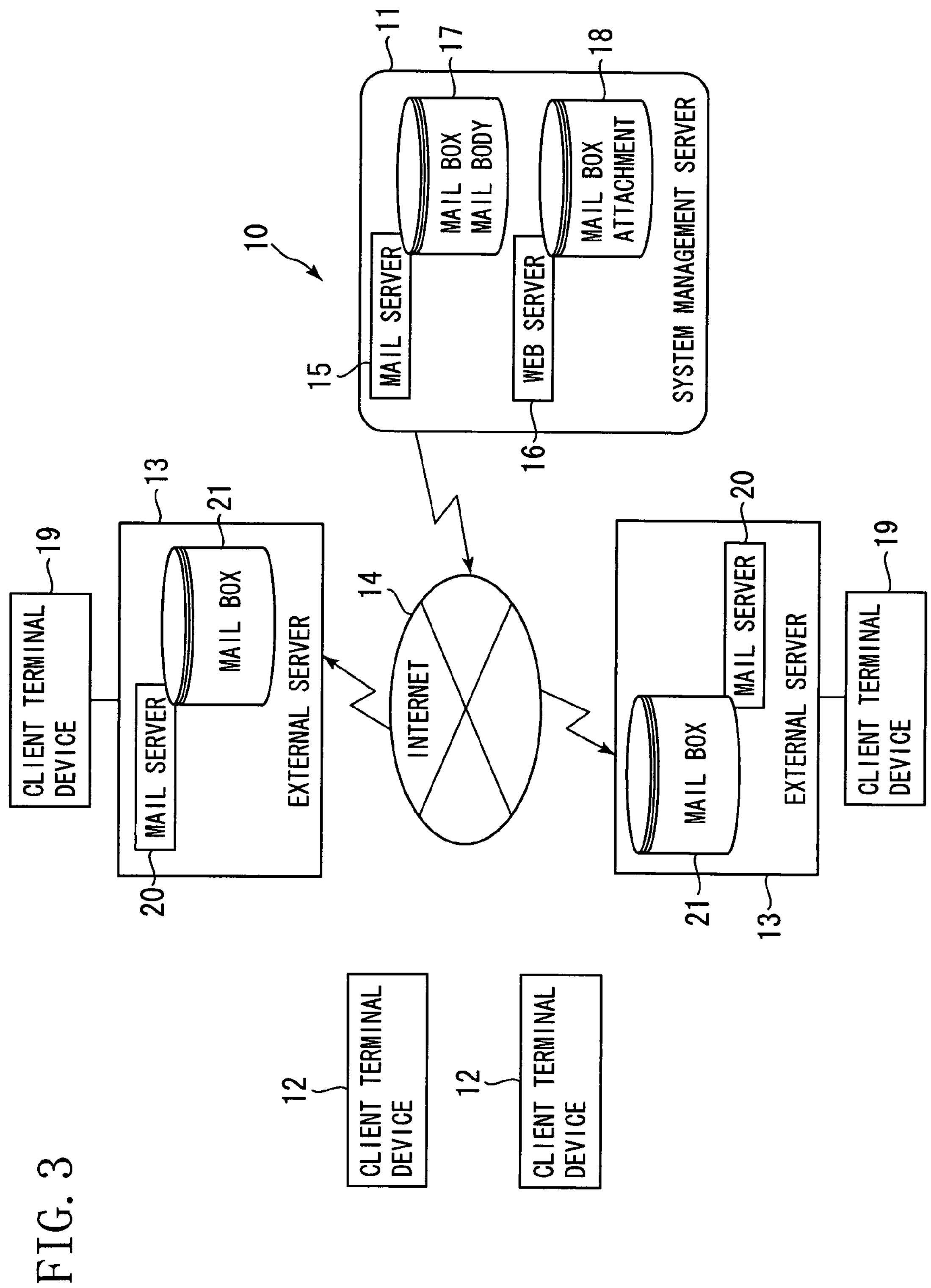
FIG. 3 is a configuration diagram of the same electronic mail transmission/reception system as in FIG. 1.
Figure 4:
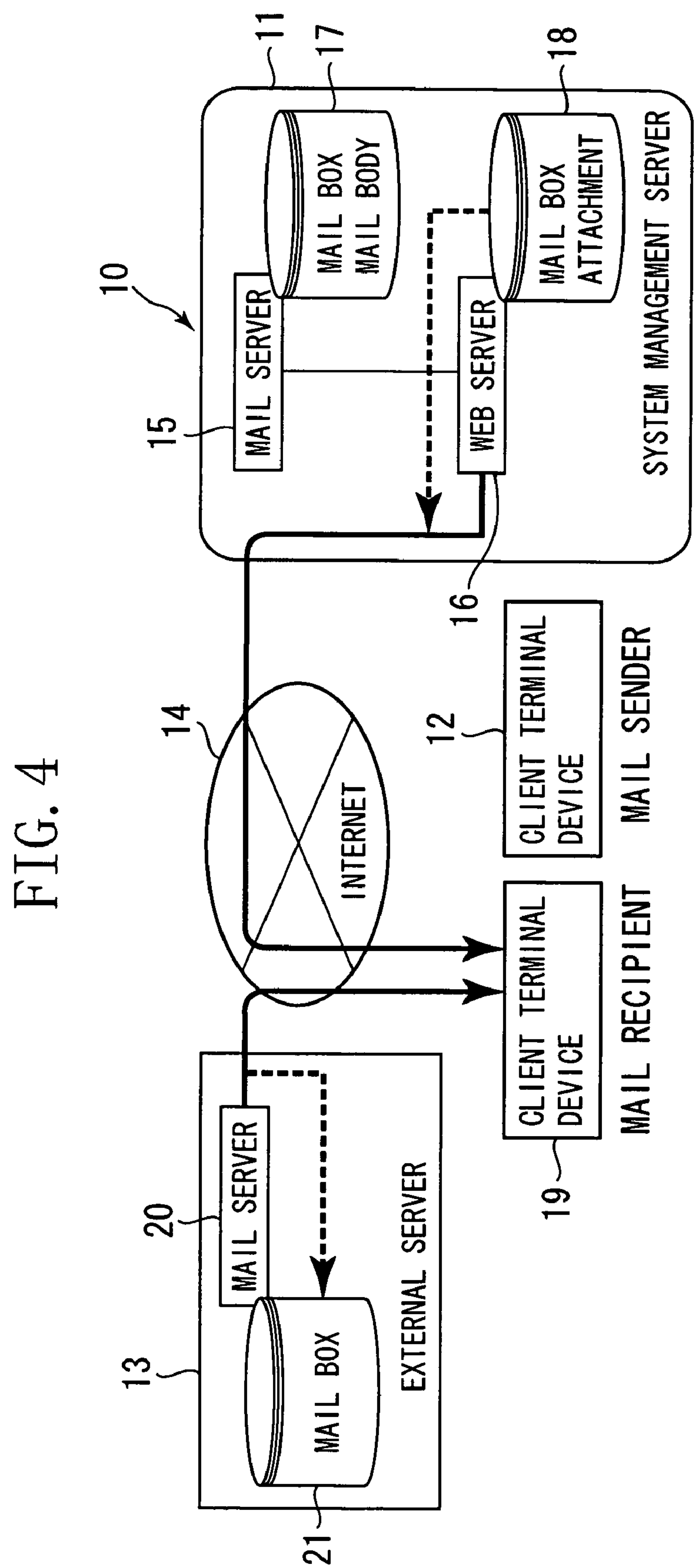
FIG. 4 is a diagram describing the details of electronic mail reception.

An electronic mail transmission/reception system will be described in detail below with reference to the accompanying drawings. FIG. 1 is a configuration diagram of an electronic mail transmission/reception system 10, which is illustrated by way of example, and FIG. 2 is a diagram describing the details of electronic mail transmission. FIG. 1 illustrates a case where electronic mail is transmitted from client terminal devices 12, which are owned by internal users (mail senders) under contract with the system 10, to a system management server 11 (first server device), which is administrated by a system administrator. FIG. 2 illustrates a case where only the mail bodies of electronic mail are transmitted from the system management server 11 to an external server 13 (second server device) owned by an external user (mail recipient) without contract with the system 10. FIG. 3 is a configuration diagram of the same electronic mail transmission/reception system 10 as in FIG. 1, and FIG. 4 is a diagram describing the details of electronic mail reception. FIG. 3 illustrates a case where the external servers 13 (second server devices) receive attachments of electronic mail from the system management server 11 (first server device).

The electronic mail transmission/reception system 10 is composed of: the system management server 11 capable of transmitting/receiving electronic mail; the client terminal devices 12 capable of transmitting/receiving electronic mail to/from the management server 11; and the external servers 13 capable of transmitting/receiving electronic mail to/from the management server 11. The servers 11 and 13 and the client terminal devices 12 are capable of mutually accessing and logging in via the Internet 14 (network). Note that FIGS. 1 and 3 show two client terminal devices 12 and two external servers 13, but the client terminal device 12 and the server 13 are not limited in number, and there may be more than two client terminal devices 12 and servers 13.

The system management server 11 is administered by the system administrator (system operating company) operating the system 10. The management server 11 relays electronic mail to the client terminal devices 12 and the external servers 13. The management server 11 is composed of a mail server 15, and a Web server 16 connected to the mail server 15 via an interface (wired or wireless). The mail server 15 and the Web server 16 are personal computers provided with a central processor (CPU or MPU) and a storage unit (memory). Although not shown, the servers 15 and 16 are connected to input devices, such as keyboard and mouse, and output devices, such as display and printer, via interfaces. The system management server 11 receives information via electronic mail from a plurality of client terminal devices 12, and transmits the information via electronic mail to a plurality of external servers 13 present on the network over the Internet 14. The management server 11 receives information via electronic mail from a plurality of external servers 13, and transmits the information via electronic mail to a plurality of client terminal devices 12 and any other external server 13. Furthermore, it receives information via electronic mail from any client terminal device 12, and transmits the information via electronic mail to any other client terminal device 12.

The mail server 15 is connected to a large-capacity mail box 17 (database) for storing mail bodies of electronic mail. The mail server 15 has stored in its memory an application program for executing each means as will be described later. The Web server 16 is connected to a large-capacity mail box 18 (database) for storing attachments of electronic mail. The Web server 16 has stored in its memory an application program for executing each means as will be described later. The application program is installed to the memory of the mail server 15 or the Web server 16 from a storage medium having it stored therein. Note that examples of the storage medium include optical disks, such as CD-ROM, semiconductor memories, and magnetic disks. The mail server 15 and the Web server 16 have stored in the memory software (mail client) for transmitting/receiving electronic mail, and electronic mail addresses of the client terminal devices 12 and the external servers 13 are retained therein.

The mail server 15 activates the application program from the memory under control of an operating system retained in the memory. The central processor of the mail server 15 executes electronic mail separation means for separating received electronic mail into a mail body and an attachment, in accordance with the activated application program. After separating the electronic mail into the mail body and the attachment through the electronic mail separation means, the central processor determines the file format of the separated attachment, and executes file format determination means for allowing/disallowing transmission of the attachment depending on the file format.

Examples of the file format include PDF file, Word file, HTML file, XML file, JavaScript file, JPEG image file, GIF image file, and MPEG image file. Also, there are encrypted file formats, such as DES file, RSA file, PGP file, S-MIME file, AES (Advanced Encryption Standard) file, and RC5 file. The file formats accepted or rejected for transmission can be set by the system administrator via the management server 11, and are pre-stored in the memory of the mail server 15. The system administrator can change the file formats accepted or rejected for transmission via the management server 11 during system operation.

These file formats are distinguished based on their MIME types. The MIME type is structured in the "type name/subtype name" form. Examples of the MIME type are as follows: "application/pdf" for the PDF file format; "text/word" for the Word file format; "text/html" for the HTML file format; "text/xml" for the XML file format; "application/java" for the JavaScript file format; "image/jpeg" for the JPEG image file format; "image/gif" for the GIF image file format; and "image/mpeg" for the MPEG image file format. Also, as for encrypted file formats, there are "cryptography/des" for DES file; "cryptography/rsa" for RSA file; "cryptography/pgp" for PGP file; "cryptography/s-mime" for S-MIME file; "cryptography/ses" for AES file; and "cryptography/rc5" for RC5 file. The central processor of the mail server 15 determines the file format of an attachment based on the MIME type, and if the attachment is in the file format not allowed to be transmitted, neither is the attachment transferred to the Web server 16 nor is the mail body corresponding to the attachment stored to the mail box 17.

Upon execution of the file format determination means, resulting in a determination that an attachment is in the file format allowed to be transmitted, the central processor of the mail server 15 executes file size determination means for determining the size of attachments when separated, and rejecting transmission of any attachment exceeding a predetermined file size. The size of an attachment is determined by the number of bytes in the attachment. The file size for comparison can be set by the system administrator via the management server 11, and is pre-stored in the memory of the mail server 15. The system administrator is able to change the file size via the management server 11 during system operation. When the central processor determines the size of an attachment to exceed the file size being set, neither is the attachment transferred to the Web server 16 nor is the mail body corresponding to the attachment stored to the mail box 17.

Upon execution of the file format determination means and the file size determination means, resulting in a determination that an attachment is in the file format allowed to be transmitted and has a predetermined file size or less, the central processor of the mail server 15 executes mail body storage means (third storage means) for storing separated mail bodies to the mail box 17. An attachment separated via the electronic mail separation means is transferred from the mail server 15 to the Web server 16. The central processor executes: URL generation means (transmission request code generation means) for generating URLs (uniform resource locators) (transmission request codes) for use by the client terminal devices 12 to request the management server 11 to transmit attachments, as well as URLs for use by the client terminal devices 19 connected to the external servers 13 to request the management server 11 to transmit attachments; code appending means for appending to mail bodies URLs for attachments corresponding to the mail bodies; and mail body transmission means for transmitting to the external servers 13 mail bodies having URLs appended thereto.

The central processor of the mail server 15 executes forcible separation means, which handles as attachments mail bodies of electronic mail for which a forcible separation identifier is being set, for forcibly separating mail bodies, along with attachments, from electronic mail. The forcibly separated mail bodies are transferred from the mail server 15 to the Web server 16, along with the attachments. Electronic mail to be forcibly separated can be set by the system administrator via the management server 11, and also by the mail sender via the client terminal device 12 when transmitting the electronic mail. The system administrator is able to change, add, and delete electronic mail to be forcibly separated via the management server 11 during system operation.

After executing the forcible separation means, the central processor of the mail server 15 executes the file format determination means and the file size determination means. Upon execution of the file format determination means and the file size determination means, resulting in a determination that an attachment is in the file format allowed to be transmitted, and has a predetermined file size or less, the central processor executes the mail body storage means, the URL generation means, the code appending means, and the mail body transmission means. The file format determination means, the file size determination means, the mail body storage means, the URL generation means, the code appending means, and the mail body transmission means have already been described, and therefore further descriptions of these means will be omitted.

Note that when a transmission time restriction identifier is being set for electronic mail, the central processor of the mail server 15 archives the electronic mail until arrival of the time for transmission. Once the transmission time arrives, the central processor executes each of the following means for the electronic mail with the transmission time restriction identifier being set: the electronic mail separation means, the file format determination means, the file size determination means, the mail body storage means, the code generation means, the code appending means, and the mail body transmission means. The transmission time restriction can be set by the system administrator administering the system 10 via the management server 11, and also by the mail sender transmitting the electronic mail via the client terminal device 12 at the time of electronic mail transmission. The system administrator is able to change the transmission time via the management server 11 during system operation. The transmission time is set in units of, for example, hours, days, weeks, or months.

The Web server 16 activates the application program from the memory under control of an operating system retained in the memory. In accordance with the activated application program, the central processor of the Web server 16 executes attachment storage means (third storage means) for storing attachments transferred from the mail server 15 to a file storage area of the mail box 18, and also executes forcibly separated file storage means (third storage means) for storing mail bodies separated via the forcible separation means to the file storage area of the mail box 18, along with attachments.

The central processor of the Web server 16 executes first conversion means for hashing restricted attachments to be transmitted to predetermined destinations by a one-way hash function, thereby converting the restricted attachments into first hash output values, and also executes first hash output value storage means (first storage means) for storing the first hash output values for the restricted attachments converted via the first conversion means to a hash value storage area of the mail box 18. For each restricted attachment, a destination restriction identifier indicating its destination is set. When an attachment is transmitted with a destination restriction identifier being set, the central processor determines it to be a restricted attachment based on the identifier, reads the hash function from the memory to hash the restricted attachment, and thereafter stores the restricted attachment to the file storage area of the mail box 18, while storing the first hash output value to the hash value storage area of the mail box 18 so as to be correlated with the restricted attachment. The destination restriction can be set by the system administrator via the management server 11, and also by the mail sender via the client terminal device 12 at the time of electronic mail transmission. The system administrator is able to change the destination in the destination restriction identifier via the management server 11 during system operation. The one-way hash function is pre-stored in the memory of the Web server 16. Any of SHA-1 (secure hash algorithm 1), MD2, MD4, MD5 (message digests 2, 4, and 5), RIPEMD-80, RIPEMD-128, RIPEMD-160, and N-Hash can be used as the one-way hash function.

The central processor of the Web server 16 executes second conversion means for hashing any attachments other than restricted attachments by the one-way hash function, and converting the attachments into second hash output values, and also executes second hash output value storage means (second storage means) for storing the second hash output values for the attachments converted via the second conversion means to the hash value storage area of the mail box 18. Upon reception of any attachments other than restricted files, the central processor reads the hash function from the memory to hash the attachments, and thereafter stores the attachments to the file storage area of the mail box 18, while storing their second hash output values to the hash value storage area of the mail box 18 so as to be correlated with the attachments.

The central processor of the Web server 16 executes destination restriction means for comparing a first hash output value with a second hash output value, and when these hash output values are equal, transmitting an attachment corresponding to the second hash output value solely to any specific destination. When an attachment transferred from the mail server 15 is converted into a second hash output value, the central processor compares the second hash output value to a first hash output value stored in the hash value storage area of the mail box 18. As a result of the comparison between these hash output values, if it is determined that the first hash output value and the second hash output value are equal, the central processor determines that the attachment corresponding to the second hash output value is identical to a restricted attachment corresponding to the first hash output value, and based on a destination restriction identifier being set for the restricted attachment, transmits the attachment solely to a client terminal device(s) 12 and/or an external server(s) 13 that is/are designated by the destination restriction identifier as a destination(s). As a result of the comparison between the hash output values, if it is determined that the first hash output value and the second hash output value differ from each other, the central processor determines that the attachment corresponding to the second hash output value and the restricted attachment corresponding to the first hash output value are different files, and transmits the attachment corresponding to the second hash output value to a client terminal device(s) 12 and/or an external server(s) 13 that is/are designated by the attachment as a destination(s).

The central processor of the Web server 16 executes transmission rejection means for sequentially comparing a second hash output value for an attachment converted via the second conversion means with the second hash output value stored via the second hash output value storage means, and when these hash output values are equal, rejecting transmission of any subsequent attachment corresponding to the second hash output value. When an attachment transferred from the mail server 15 is converted to a second hash output value, the central processor compares a second hash output value for the transferred attachment with a second hash output value stored in the hash value storage area of the mail box 18. As a result of the comparison between these second hash output values, if it is determined that the second hash output values are equal, the central processor determines that the transferred attachment is identical to an attachment corresponding to the second hash output value that has already been stored in the mail box 18, so that the transferred attachment is not transmitted to any client terminal device 12 and external server 13.

The central processor of the Web server 16 reversely transfers the attachment rejected for transmission by the transmission rejection means to the mail server 15. The central processor of the mail server 15 erases from the mail box 17 the mail body corresponding to the reversely transferred attachment. As a result of the comparison between the second hash output values, if it is determined that the second hash output values differ from each other, the central processor determines that the transmitted attachment differs from an attachment corresponding to the second hash output value that has already been stored in the mail box 17, and transmits any subsequent attachment corresponding to the second hash output value to a client terminal device(s) 12 and/or an external server(s) 13 that is/are designated by the attachment as a destination(s).

The central processor of the Web server 16 executes transmission period restriction means for transmitting attachments only within a predetermined period of time in which to allow transmission. Based on a transmission period restriction identifier being set for attachments, the central processor manages the time period in which to allow transmission of the attachments. The transmission period of the attachments can be set by the system administrator via the management server 11. The time period in which to allow transmission of the attachments is pre-stored in the memory of the Web server 16. The system administrator is able to change the transmission period via the management server 11 during system operation. The transmission period is set in units of, for example, hours, days, weeks, or months. Once the transmission period indicated by the transmission period restriction identifier is completed, the central processor rejects transmission of the attachments with the transmission period restriction identifier being set.

The central processor of the Web server 16 can also determine the time period in which to allow transmission of attachments based on the file format of the attachments. The central processor determines the file format of the attachments based on its MIME type, and sets a transmission period restriction identifier for the attachments in that file format, thereby managing the time period in which to allow transmission of the attachments based on the transmission period restriction identifier being set. The time period in which to allow transmission and the file format for which the time period is being set can be set by the system administrator via the management server 11. The time period in which to allow transmission and the file format for which the time period is being set are pre-stored in the memory of the Web server 16. The system administrator is able to change the transmission period for the file format via the management server 11 during system operation. For example, in the case where a transmission period restriction identifier is being set for attachments, such as Word files, JavaScript files, GIF image files, DES files, and PGP files, once the transmission period indicated by the transmission period restriction identifier is completed, the central processor rejects transmission of attachments in such file formats.

The central processor of the Web server 16 executes transmission delay means for delaying transmission of a predetermined attachment until arrival of the time for allowing transmission of the attachment, and once the time for allowing transmission arrives, transmitting the attachment to a client terminal device(s) 12 and/or an external server(s) 13. The central processor manages the time for starting transmission of the attachment based on a transmission start time identifier being set for the attachment. The transmission start time for the attachment can be set by the system administrator via the management server 11. The transmission start time for the attachment is pre-stored in the memory of the Web server 16. The system administrator is able to change the transmission start time via the management server 11 during system operation. The transmission start time is set in units of, for example, hours, days, weeks, or months. Once the transmission time indicated by the transmission start time identifier arrives, the central processor allows transmission of the attachment with the transmission start time identifier being set to a client terminal device(s) 12 and/or an external server(s) 13. The attachment with the transmission start time identifier being set is not transmitted before the transmission time arrives.

The central processor of the Web server 16 can also determine the transmission start time for attachments based on the file format of the attachments. The central processor determines the file format of the attachments based on their MIME types, and sets a transmission start time identifier for the attachments in that file format, thereby managing the transmission start time of the attachments based on the transmission start time identifier being set. The transmission start time and the file format for which the time is being set can be set by the system administrator via the management server 11. The transmission start time and the file format for which the time is being set are pre-stored in the memory of the Web server 16. The system administrator is able to change the transmission start time and the file format for which the time is being set via the management server 11 during system operation. For example, in the case where the transmission start time identifier is being set for attachments, such as Word files, JavaScript files, GIF image files, DES files, and PGP files, once the transmission time indicated by the transmission start time identifier arrives, the central processor allows transmission of attachments in such file formats. Attachments in such file formats are not transmitted before the transmission time arrives.

The client terminal device 12 is owned and managed by an internal user of the system 10 (an electronic mail sender/recipient under contract with the system 10). The client terminal device 12 is a personal computer provided with a central processor (CPU or MPU) and a storage unit (memory). Although not shown, the client terminal device 12 is connected to input devices, such as keyboard and mouse, and output devices, such as display and printer, via interfaces. The client terminal device 12 has stored in its memory software (mail client) for transmitting/receiving electronic mail, as well as electronic mail addresses of the management server 11 and the external servers 13. The client terminal device 12 is capable of transmitting text data, graphic data, image data, video data, and audio data via electronic mail to the management server 11 over the Internet 14, and also capable of receiving such data via electronic mail from the management server 11.

The external server 13 is installed on the side of an external user of the system 10 (an electronic mail sender/recipient without contract with the system 10). The external server 13 is composed of a mail server 20, and a large-capacity mail box 21 (database) for storing electronic mail. The mail server 20 is a personal computer provided with a central processor (CPU or MPU) and a storage unit (memory). The mail server 20 has stored in its memory software (mail client) for transmitting/receiving electronic mail, as well as electronic mail addresses of the management server 11 and the client terminal devices 12 and 19. The mail server 20 is connected to the client terminal device 19 via an interface.

The mail server 20 receives text data, graphic data, image data, video data, and/or audio data via electronic mail from the client terminal device 19, and transmits the data via electronic mail to the management server 11 over the Internet 14. The mail server 20 receives the data via electronic mail from the management server 11 over the Internet 14, and transfers the data via electronic mail to the client terminal device 19. The client terminal device 19 is a personal computer provided with a central processor (CPU or MPU) and a storage unit (memory). The client terminal device 19 has stored in its memory software (mail client) for transmitting/receiving electronic mail, as well as electronic mail addresses of the management server 11 and the client terminal devices 12. Although not shown, the mail server 20 and the client terminal device 21 are connected to input devices, such as keyboard and mouse, and output devices, such as display and printer, via interfaces.

Used as the software (mail client) stored in the mail servers 15 and 20, the Web server 16, and the client terminal devices 12 and 19 are electronic mail transmission software, e.g., SMTP (Simple Mail Transfer Protocol), and electronic mail reception software, e.g., POP3 (Post Office Protocol version 3). Furthermore, MIME (Multipurpose Internet Mail Extensions) is used for transmitting/receiving multipart media-type electronic mail.

MIME is an extended version of the standard format of the SMTP or POP3, by which any data is converted (encoded) into character format, and transmitted as an attachment. Encoding schemes used in MIME are Quoted-Printable and Base64. MIME converts (decodes) a received character format into data, thereby recovering an original file. MIME adds information, such as "file name" and "file type", as a MIME header, and inserts a "converted file delimiter", thereby creating a multipart media type (multipart message) consisting of a plurality of parts. Here, the multipart media type is a media type with a plurality of attachments. For example, attaching a file with text described in a mail body results in a multipart format. The multipart media type has each part partitioned by the character string "boundary". In the case of MIME, information (MIME type) representing a data class (data type) is described in a Content-Type header. The MIME type correlates a file extension with a file data class (data type).

An example of transmitting electronic mail from the client terminal device 12 to the system management server 11 will be described below with reference to FIGS. 1 and 2. A mail sender, which is an internal user of the system 10 (the internal user owning the client terminal device 12), accesses and logs in the management server 11 via the client terminal device 12 to transmit attachments providing various information (text data, graphic data, image data, video data, audio data) to the management server 11, along with a mail body. The management server 11 receives multipart media-type electronic mail composed of the mail body and the attachments, from the client terminal device 12. Upon reception of the electronic mail from the client terminal device 12, the central processor of the mail server 15 confirms each identifier being set for the electronic mail. The identifiers being set for the electronic mail are forcible separation, transmission time restriction, destination restriction, transmission period restriction, and transmission start time identifiers, among which the forcible separation identifier and the transmission time restriction identifier are confirmed by the mail server 15.

When such identifiers are not being set, the central processor of the mail server 15 separates the received electronic mail into the mail body and the attachments (electronic mail separation means). The central processor identifies the file formats of the received attachments based on their MIME types, thereby determining whether or not the attachments are allowed to be transmitted (file format determination means). For example, it is assumed that attachments of the Word type, JavaScript, and DES file formats are disallowed to be transmitted, and attachments of other types are allowed to be transmitted. The central processor compares the file formats of the received attachments with the file formats retained in the memory allowed or disallowed to be transmitted, and when there is any attachment having a file format disallowed to be transmitted, the file format of the attachment is indicated on the display of the client terminal device 12, along with a message indicating that the attachment is disallowed to be transmitted.

As a result of the comparison between the file formats retained in the memory and the file formats of the transferred attachments, when there is any attachment having a file format allowed to be transmitted, the central processor of the mail server 15 compares the size of the attachment to a file size retained in the memory, thereby determining whether or not the size of the attachment exceeds that file size (file size determination means). Upon determination that the size of the attachment exceeds the preset file size, the central processor indicates the excess of the attachment over the file size and the size of the attachment on the display of the client terminal device 12, along with a message indicating that the attachment is disallowed to be transmitted.

As a result of the comparison between the size of the attachment and the file size retained in the memory, if the size of the attachment is the preset file size or less, the central processor of the mail server 15 stores the separate mail body to the mail box 17 (mail body storage means) (third storage means), and transfers the separate attachment to the Web server 16. In an example of the procedure for the mail server 15 to separate electronic mail into a mail body and attachments, multipart media-type electronic mail is divided into parts with "boundaries", and the mail body part and the attachment parts are classified based on header information about the divisional parts (header information indicating the mail body and header information indicating the attachments), thereby separating the mail body from the attachments. When there is any attachment having a file format disallowed to be transmitted, or when the attachment exceeds the file size, the central processor of the mail server 15 neither stores the mail body to the mail box 17 nor transfers the attachment to the Web server 16.

When a forcible separation identifier is being set for received electronic mail, the central processor of the mail server 15 forcibly separates a mail body along with attachments (forcible separation means). After executing the forcible separation means, the central processor executes the file format determination means and the file size determination means. When there is any attachment having a file format allowed to be transmitted and a predetermined file size or less, the central processor unites the mail body with the attachment, and transfers the mail body to the Web server 16, along with the attachment. In this case, the mail body is not stored to the mail box 17.

When a transmission period restriction identifier is being set for received electronic mail, the central processor of the mail server 15 stores and archives the electronic mail in the transmission-delayed file storage area of the mail box 17 until arrival of the transmission time indicated by the transmission time restriction identifier. The transmission time restriction identifier is retained in the memory of the mail server 15 so as to be correlated with the electronic mail for which it is being set. When the transmission time indicated by the transmission time restriction identifier arrives, the central processor reads from the mail box 17 the electronic mail for which the transmission time has arrived, and separates the electronic mail into a mail body and attachments (electronic mail separation means). Thereafter, the central processor executes the file format determination means and the file size determination means. When there is any attachment having a file format allowed to be transmitted and a predetermined file size or less, the central processor stores the separate mail body to the mail box 17 (mail body storage means) (third storage means), and transfers the separate attachment to the Web server 16.

When a transmission time restriction identifier and a forcible separation identifier are being set for transmitted electronic mail, the central processor of the mail server 15 stores and archives the electronic mail in the transmission-delayed file storage area of the mail box 17 until arrival of the transmission time indicated by the transmission time restriction identifier. When the transmission time indicated by the transmission time restriction identifier arrives, the central processor forcibly separates a mail body along with attachments (forcible separation means). After executing the forcible separation means, the central processor executes the file format determination means and the file size determination means. When there is any attachment having a file format allowed to be transmitted and a predetermined file size or less, the central processor unites the mail body with the attachment, and transfers the mail body to the Web server 16, along with the attachment.

Upon reception of the attachment, the central processor of the Web server 16 confirms each identifier being set for the attachment. The identifiers to be confirmed by the Web server 16 are destination restriction, transmission time restriction, and transmission start time identifiers. The central processor confirms whether any destination restriction identifier is being set for the attachment. When the destination restriction identifier is being set for the attachment, the central processor determines the attachment to be a restricted attachment, and stores the restricted attachment to the attachment storage area of the mail box 18 (attachment storage means) (third storage means), while reading the one-way hash function from the memory to hash the restricted attachment by the one-way hash function, thereby converting the restricted attachment into a first hash output value (first conversion means). The central processor stores the first hash output value for the restricted attachment to the hash value storage area of the mail box 18 (hash output value storage means) (first storage means).

When no destination restriction identifier is being set for the attachment, the central processor of the Web server 16 determines the attachment to be an ordinary one, and stores the attachment transferred from the mail server 15 to the file storage area of the mail box 18 (attachment storage means) (third storage means). The central processor reads the one-way hash function from the memory to hash the received attachment by the one-way hash function, thereby converting the attachment into a second hash output value (second conversion means). The central processor stores the second hash output value for the attachment to the hash value storage area of the mail box 18 (hash output value storage means) (second storage means). Furthermore, the central processor stores the mail body separated via the forcible separation means to the file storage area of the mail box 18, along with the attachment (forcibly separated file storage means) (third storage means), while hashing the mail body and the attachment by the one-way hash function, thereby converting the mail body and the attachment into second hash output values (second conversion means), before storing the second hash output values to the hash value storage area of the mail box 18 (hash output value storage means) (second storage means). The central processor transfers a portion of the hash output value for the attachment to the mail server 15. Here, used as the portion of the hash output value is, for example, a hash output value corresponding to several characters in the first line of attached mail, or a hash output value for the header portion of the attachment.

Upon reception of the portion of the hash output value from the Web server 16, the central processor of the mail server 15 generates URLs (transmission request code) for use by the client terminal device 12 to request the system management server 11 to transmit the attachment, and also generates URLs for use by the client terminal device 19 connected to the external server 13 to request the management server 11 to transmit the attachment (URL generation means) (code generation means). The URL is generated for each part of the attachment corresponding to the mail body. In addition to the URLs, the central processor generates passwords and accounts, each of which corresponds to an electronic mail address in order to confirm whether the system user is authentic. The central processor appends to each URL generated a portion of the hash output value transferred from the Web server 16, and stores the URL to the URL storage area of the mail box 17 so as to be correlated with the mail body, and the generated password and account to an authorization number storage area of the mail box 17 so as to be correlated with the electronic mail address.

After generating the URLs, the central processor of the mail server 15 appends to the mail body the URLs for the attachment corresponding to the mail body (code appending means). The central processor transmits to the external server 13 the mail body having the URLs appended thereto, along with the password and the account (mail body transmission means). The mail body transmission means only transmits to the external server 13 the mail body of the electronic mail having the URLs appended thereto, so that the attachment corresponding to the mail body is not transmitted to the external server 13. Note that when the central processor executes the forcible separation means, the mail body is not transmitted to the external server 13, so that only the URLs are transmitted to the external server 13, along with the password and the account. The mail server 20 of the external server 13 stores the password, the account, the mail body having the URLs appended thereto, and the URLs to the mail box 21.

When the client terminal device 12 of the mail sender transmits a series of electronic mail, and the mail server 15 transfers attachments of the electronic mail to the Web server 16, the central processor of the Web server 16 sequentially compares second hash output values obtained by hashing the attachments of the electronic mail with the second hash output value stored in the mail box 18. When these second hash output values are equal, the central processor determines the transmitted attachment to be identical to an attachment already stored in the mail box 18 that corresponds to the hash output value, and transmits a transmission rejection for the transmitted attachment to the client terminal device 12 (transmission rejection means). The client terminal device 12 indicates a transmission rejection message on the display. The central processor of the Web server 16 reversely transfers the attachment rejected for transmission by the transmission rejection means to the mail server 15. The central processor of the mail server 15 erases from the mail box 17 the mail body corresponding to the reversely transferred attachment.

An example where the external server 13 receives an attachment from the system management server 11 will be described below with reference to FIGS. 3 and 4. A mail recipient (an external user owning the client terminal device 19 connected to the external server 13) accesses and logs in the external server 13 via the client terminal device 19, and receives from the mail box 21 of the external server 13 a mail body or a URL stored therein. The display of the client terminal device 19 indicates the mail body (when the mail body is separated by the forcible separation means, only URLs), URLs appended to the mail body, a password, and an account. When requesting transmission of not only the mail body but also the attachment added thereto, the mail recipient clicks on a URL indicated on the display. Once the mail recipient clicks on the URL, the external server 13 requests the management server 11 to transmit the attachment corresponding to the URL.

Upon reception of the request to transmit the attachment, the system management server 11 requests the external server 13 to perform the authorization procedure for authorizing transmission of the attachment (authorization request means). The mail server 20 causes the client terminal device 19 to indicate on the display an authorization area in which to enter the password and the account. The mail recipient (external user) enters the previously received password and account in the authorization area via a keyboard. Note that the account is required to be established only once, and after the establishment of the account, only the password is required to be entered in the authorization area. When the entered password or account is incorrect, an error message for the password or account as well as an instruction to re-enter them are indicated on the display of the client terminal device 19. When the entered password and account are correct, the management server 11 starts the procedure for transmitting the attachment.

The central processor of the Web server 16 compares the second hash output value for the attachment corresponding to the URL with a first hash output value for a restricted attachment stored in the mail box 18. When the central processor determines that the first hash output value and the second hash output value are equal, it determines that the attachment corresponding to the second hash output value is identical to the restricted file corresponding to the first hash output value. After determining that the first hash output value and the second hash output value are equal, the central processor refers to the destination restriction identifier being set for the attachment corresponding to the first hash output value, and determines whether the e-mail address for the client terminal device 19 of the mail recipient having requested transmission of the attachment is identical to the e-mail address indicated by the destination restriction identifier.

Upon determination that the e-mail address for the client terminal device 19 and the e-mail address indicated by the destination restriction identifier are identical, the central processor of the Web server 16 reads the attachment corresponding to the URL from the mail box 18, and transmits the attachment to the external server 13 connected to the client terminal device 19 (transmission restriction means). The attachment is stored to the mail box 21 of the mail server 20, and then transferred from the mail server 20 to the client terminal device 19 of the mail recipient. The mail recipient is able to confirm the contents of the attachment via the display of the client terminal device 19. Upon determination that the e-mail address for the client terminal device 19 of the mail recipient is not identical to the e-mail address indicated by the destination restriction identifier, the central processor of the Web server 16 indicates the inconsistency of the e-mail addresses on the display of the client terminal device 19, along with a message indicating that the attachment is disallowed to be transmitted.

Figure 5:
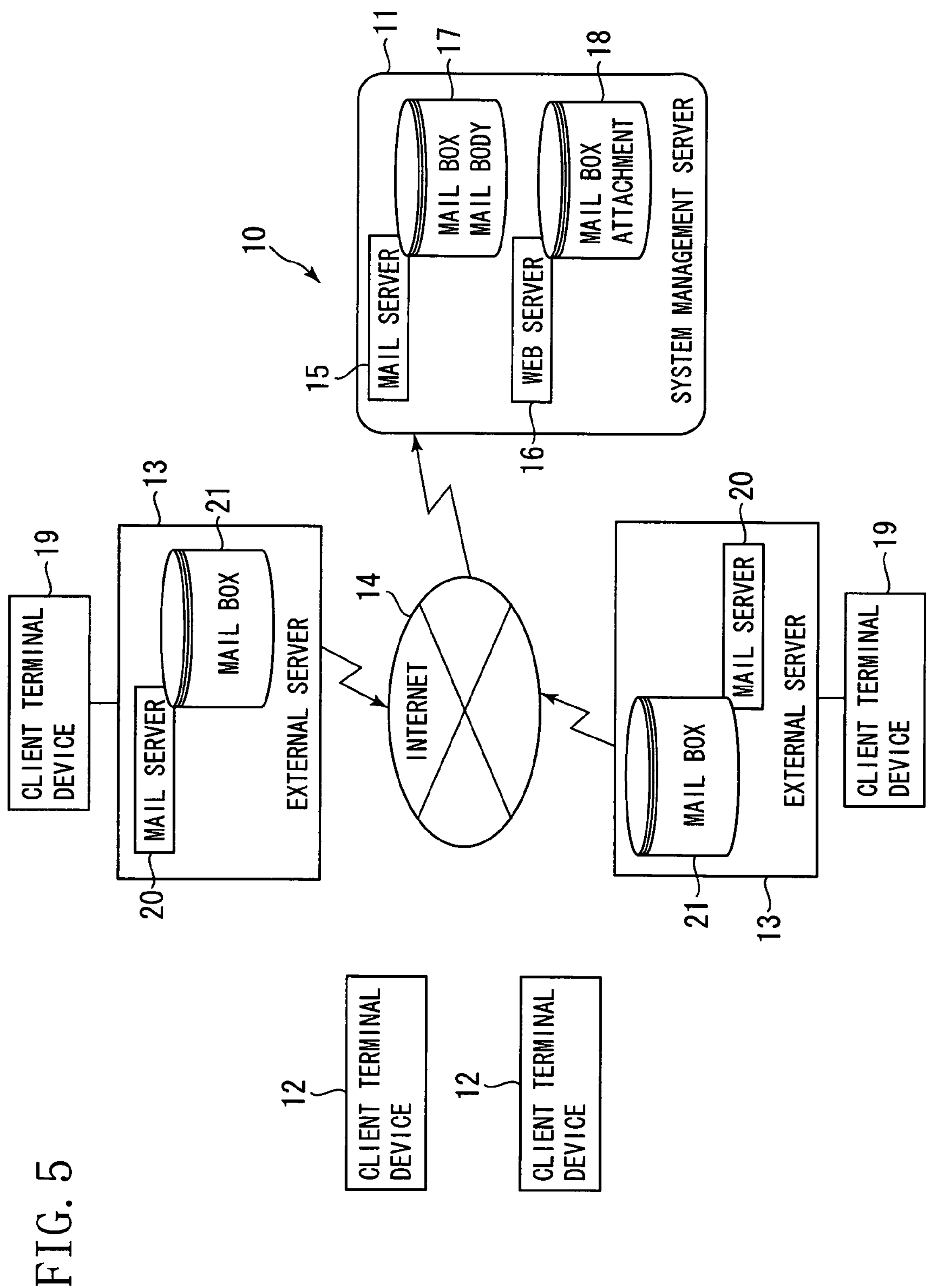
FIG. 5 is a configuration diagram of the same electronic mail transmission/reception system as in FIG. 1.
Figure 6:
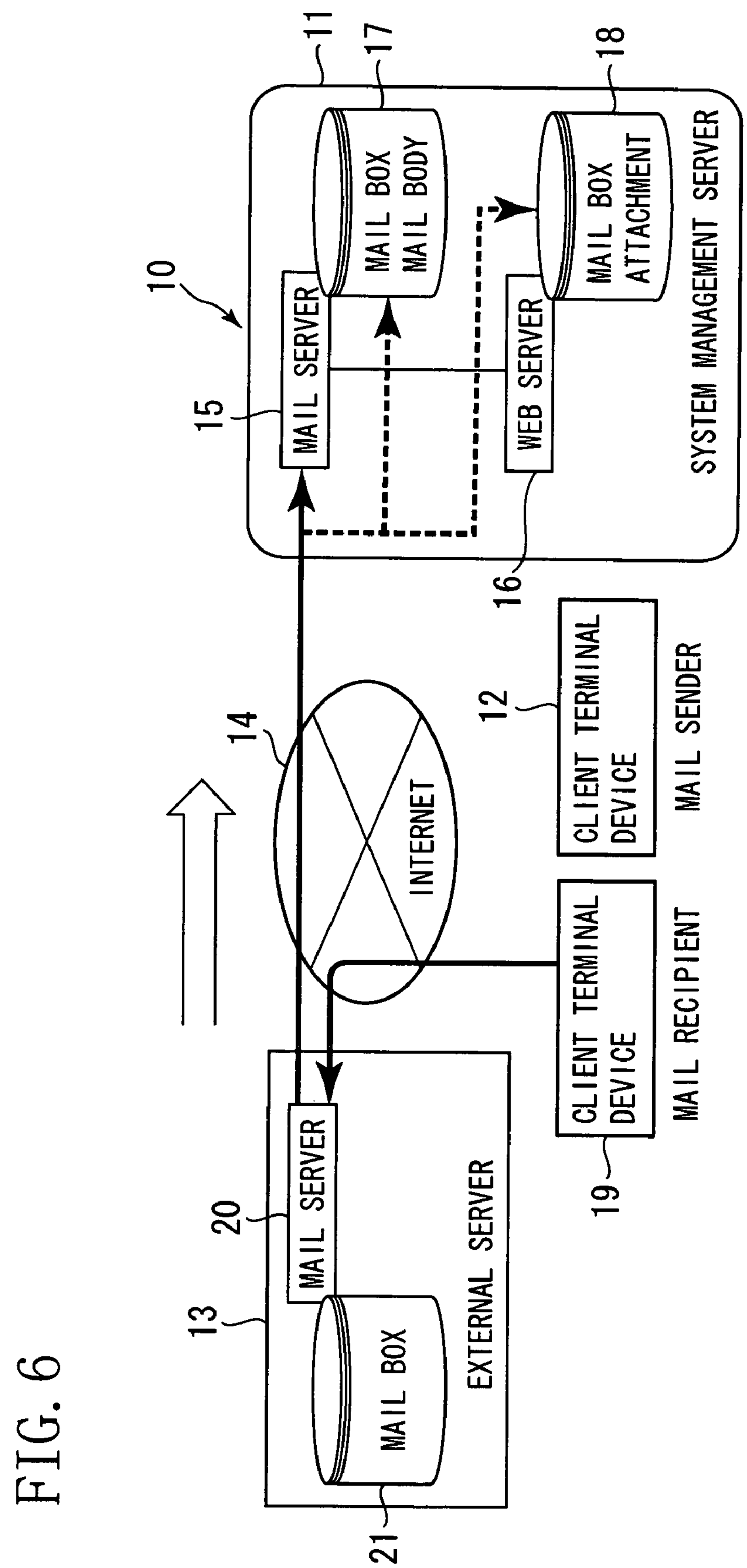
FIG. 6 is a diagram describing the details of electronic mail transmission.
Figure 7:
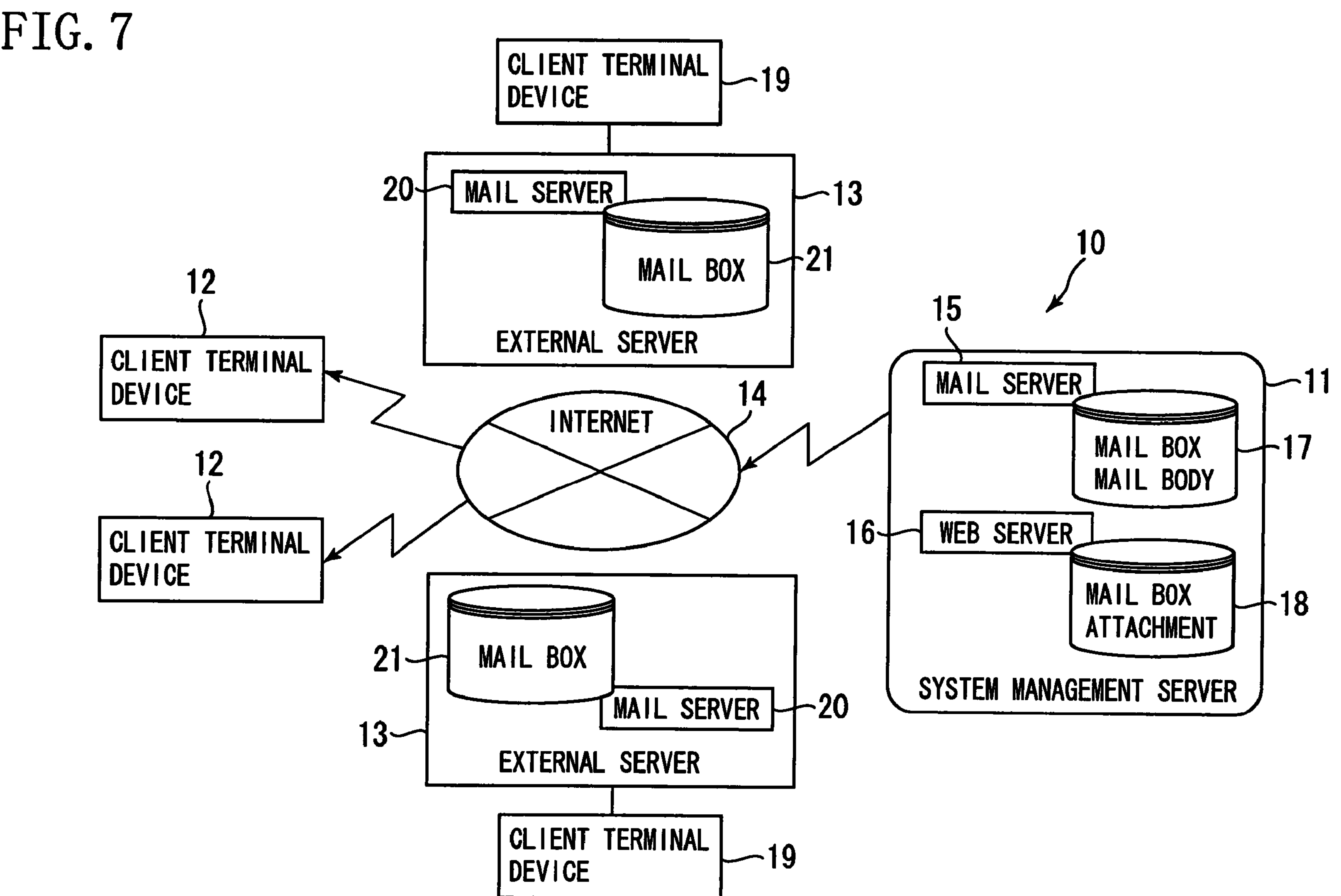
FIG. 7 is a configuration diagram of the same electronic mail transmission/reception system as in FIG. 1.
Figure 8:
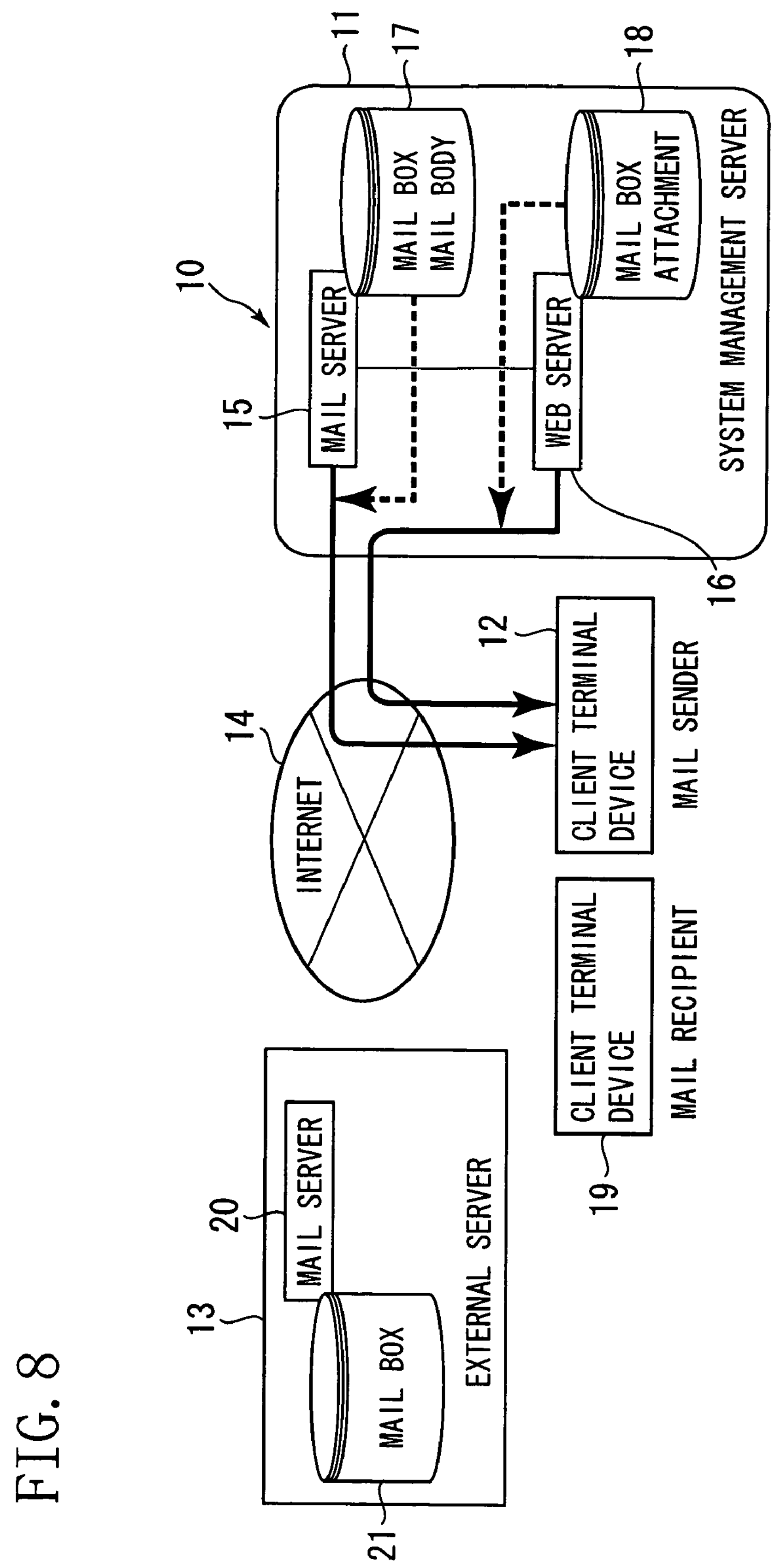
FIG. 8 is a diagram describing the details of electronic mail reception.

FIG. 5 is a configuration diagram of the same electronic mail transmission/reception system 10 as in FIG. 1, and FIG. 6 is a diagram describing the details of electronic mail transmission. FIGS. 5 and 6 illustrate a case where electronic mail is transmitted from the external server 13 (second server device) to the system management server 11 (first server device). FIG. 7 is a configuration diagram of the same electronic mail transmission/reception system 10 as in FIG. 1, and FIG. 8 is a diagram describing the details of electronic mail reception. FIGS. 7 and 8 illustrate a case where the client terminal device 12 receives attachments of electronic mail from the system management server 11 (first server device).

An example of transmitting electronic mail from the external server 13 to the system management server 11 will be described below with reference to FIGS. 5 and 6. A mail sender (an external user owning the client terminal device 19 connected to the external server 13) accesses and logs in the external server 13 via the client terminal device 19, and transfers attachments, along with a mail body, from the client terminal device 19 to the mail server 20 of the external server 13. The mail server 20 transmits multipart media-type electronic mail composed of the mail body and the attachments to the system management server 11. The management server 11 receives the multipart media-type electronic mail from the mail server 20. Upon reception of the electronic mail from the mail server 20, the central processor of the mail server 15 confirms whether any forcible separation identifier or transmission period restriction identifier is being set for the electronic mail. When such an identifier is not being set, the central processor of the mail server 15 separates the received electronic mail into the mail body and the attachments (electronic mail separation means).

The central processor of the mail server 15 distinguishes the file formats of the received attachments based on their MIME types, and determines whether the attachments are allowed or disallowed to be transmitted (file format determination means). The central processor compares the file formats of the received attachments with file formats retained in the memory that are allowed or disallowed to be transmitted, and when there is any attachment having a file format disallowed to be transmitted, the file format of the attachment is indicated on the display of the client terminal device 19, along with a message indicating that the attachment is disallowed to be transmitted.

As a result of the comparison between the file formats retained in the memory and the file format of the transferred attachment, when there is any attachment having a file format allowed to be transmitted, the central processor of the mail server 15 compares the size of the attachment with a file size retained in the memory, thereby determining whether or not the size of the attachment exceeds that file size (file size determination means). Upon determination that the size of the attachment exceeds the preset file size, the central processor indicates the excess of the attachment over the file size and the size of the attachment on the display of the client terminal device 19, along with a message indicating that the attachment is disallowed to be transmitted.

As a result of the comparison between the size of the attachment and the file size retained in the memory, when the size of the attachment is determined to be a preset file size or less, the central processor of the mail server 15 stores the separate mail body to the mail box 17 (mail body storage means) (third storage means), and transfers the separate attachment to the Web server 16. When the attachment has a file format disallowed to be transmitted, or when the attachment exceeds the file size, the central processor of the mail server 15 neither stores the mail body to the mail box 17 nor transfers the attachment to the Web server 16. When the forcible separation identifier is being set for the received electronic mail by the system administrator, when the transmission time restriction identifier is being set for the received electronic mail by the system administrator, or when the transmission time restriction identifier and the forcible separation identifier are being set for the transmitted electronic mail by the system administrator, the process to be performed by the central processor of the mail server 20 is the same as that in FIGS. 1 and 2, and therefore any description thereof will be omitted.

Upon reception of the attachment, the central processor of the Web server 16 confirms whether or not any of the destination restriction, transmission time restriction, and transmission start time identifiers are being set for the attachment. When the destination restriction identifier is being set for the attachment, the central processor stores the restricted attachment to the attachment storage area of the mail box 18 (attachment storage means) (third storage means), and reads the one-way hash function from the memory to hash the restricted attachment by the one-way hash function, thereby converting the restricted attachment into a first hash output value (first conversion means). The central processor stores the first hash output value for the restricted attachment to the hash value storage area of the mail box 18 (hash output value storage means) (first storage means).

When no destination restriction identifier is being set for the attachment, the central processor of the Web server 16 stores the attachment transferred from the mail server 15 to the file storage area of the mail box 18 (attachment storage means) (third storage means), and reads the one-way hash function from the memory to hash the received attachment by the one-way hash function, thereby converting the attachment into a second hash output value (second conversion means). The central processor stores the second hash output value for the attachment to the hash value storage area of the mail box 18 (hash output value storage means) (second storage means). Furthermore, the central processor stores the mail body separated via the forcible separation means to the file storage area of the mail box 18, along with the attachment (forcibly separated file storage means) (third storage means), and hashes the mail body and the attachment by the one-way hash function, thereby converting the mail body and the attachment into second hash output values (second conversion means) before storing the second hash output values to the hash value storage area of the mail box 18 (hash output value storage means) (second storage means). The central processor transfers a portion of the hash output value for the attachment to the mail server 15.

Upon reception of the portion of the hash output value from the Web server 16, the central processor of the mail server 15 generates URLs (transmission request codes) for use by the client terminal device 19 to request the system management server 11 to transmit the attachment, as well as URLs for use by the client terminal device 12 to request the system management server 11 to transmit the attachment (URL generation means) (code generation means). In addition to the URLs, the central processor generates passwords and accounts, each of which corresponds to an electronic mail address in order to confirm whether the system user is authentic. The central processor appends to each URL generated a portion of the hash output value transferred from the Web server 16, and stores the URL to the URL storage area of the mail box 17 so as to be correlated with the mail body, and the generated password and account to the authorization number storage area of the mail box 17 so as to be correlated with the electronic mail address. After generating the URLs, the central processor appends to the mail body the URLs for the attachment corresponding to the mail body (code appending means). The central processor stores to the mail box 17 the mail body having the URLs appended thereto. Note that when the central processor executes the forcible separation means, only the URLs are stored to the mail box 17.

When the client terminal device 19 of the mail sender (external user) transmits a series of electronic mail, and attachments of the electronic mail are transferred from the mail server 15 to the Web server 16, the central processor of the Web server 16 sequentially compares second hash output values obtained by hashing the attachments of the electronic mail with a second hash output value stored in the mail box 18. When these hash output values are equal, the central processor determines that the transmitted attachment is identical to an attachment already stored in the mail box 18 that corresponds to the hash output value, and transmits a transmission rejection for the transmitted attachment to the external server 13 (transmission rejection means). The external server 13 indicates a transmission rejection message on the display of the client terminal device 19. The central processor of the Web server 16 reversely transfers the attachment rejected for transmission by the transmission rejection means to the mail server 15. The central processor of the mail server 15 erases from the mail box 17 the mail body corresponding to the reversely transferred attachment.

An example where the client terminal device 12 receives an attachment from the system management server 11 will be described below with reference to FIGS. 7 and 8. A mail recipient (an internal user owning the client terminal device 12) accesses and logs in the system management server 11 via the client terminal device 12, and receives from the mail box 17 of the mail server 15 a mail body with an appended URL stored therein or the URL. The display of the client terminal device 12 indicates the mail body (in the case where the mail body is separated by the forcible separation means, only the URL), the URL appended to the mail body, a password, and an account. When requesting transfer of not only the mail body but also the attachment added thereto, the mail recipient clicks on the URL indicated on the display. When the mail recipient clicks on the URL, the system management server 11 requests the client terminal device 12 to perform the authorization procedure for authorizing transfer of the attachment (authorization request means). The mail recipient enters the received password in the authorization area via a keyboard. When the entered password is incorrect, a password error message and an instruction to re-enter the password are indicated on the display of the client terminal device 12. When the entered password is correct, the management server 11 starts the procedure for transferring the attachment.

The central processor of the Web server 16 compares the second hash output value for the attachment corresponding to the URL with the first hash output value for the restricted attachment stored in the mail box 18. Upon determination that the first hash output value and the second hash output value are equal, the central processor determines that the attachment corresponding to the second hash output value is identical to the restricted attachment corresponding to the first hash output value. After determining that the first hash output value and the second hash output value are equal, the central processor refers to the destination restriction identifier being set for the attachment corresponding to the first hash output value to determine whether or not the e-mail address for the client terminal device 12 of the mail recipient having requested transfer of the attachment is identical to the e-mail address indicated by the destination restriction identifier.

Upon determination that the e-mail address for the client terminal device 12 is identical to the e-mail address indicated by the destination restriction identifier, the central processor of the Web server 16 reads the attachment corresponding to the URL from the mail box 18, and transfers the attachment to the client terminal device 12 (transmission restriction means). The mail recipient is able to confirm the contents of the attachment via the display of the client terminal device 12. Upon determination that the e-mail address for the client terminal device 12 of the mail recipient is not identical to the e-mail address indicated by the destination restriction identifier, the central processor of the Web server 16 indicates the inconsistency of the e-mail addresses on the display of the client terminal device 12, along with a message indicating that the attachment is disallowed to be transmitted.

The Web server 16 erases the second hash output value stored in the mail box 18 after a predetermined period of time since its storage (hash value erasing means), and also erases the attachment stored in the mail box 18 (in the case where the forcible separation means is executed, the mail body and the attachment) after a predetermined period of time since its storage (attachment erasing means). The period of retaining the second hash output value and the attachment can be set by the system administrator via the management server 11. The period of retaining the second hash output value and the attachment is pre-stored in the memory of the Web server 16. The system administrator is able to change the period of retaining the second hash output value and the attachment via the management server 11 during system operation. The retaining period is set in units of, for example, hours, days, weeks, or months. The system 10 can be used not only for the Internet 14 but also for network technology of, for example, broadband networks using local area network and Ethernet (registered trademark).

The electronic mail transmission/reception system 10, after separating received electronic mail into a mail body and attachments, appends URLs generated for the attachments to the mail body, and transmits to the external server 13 the mail body having the URLs appended thereto, and therefore it is possible to reduce burden on the memory space of the external server 13 due to storage of the attachments, thereby preventing the memory space of the server 13 from decreasing due to transmission of not only the mail body but also all the attachments to the external server 13. In the system 10, the external server 13 receives only the mail body, and therefore even if the external server 13 receives electronic mail in a concentrated manner within a short period of time, the memory space of the external server 13 would not decrease significantly, so that it is possible to reliably prevent shortage of the memory space of the server 13. In the system 10, only the mail body, excluding the attachments, is transferred from the external server 13 to the client terminal device 19, and therefore when compared to the case of transferring electronic mail including attachments from the external server 13 to the client terminal device 19, it is possible to significantly shorten the transfer time from the external server 13 to the client terminal device 19.

In the system 10, the attachment is temporarily stored and archived in the mail box 18 of the Web server 16 before transmission, and therefore if the attachment turned out later to be highly confidential data, it is possible to stop transmitting the attachment to the client terminal devices 12 and 19, thereby reliably maintaining the confidentiality of the attachment. In the system 10, when the client terminal device 12, 19, uses a URL to request attachment transmission of the management server 11, the management server 11 transmits to the client terminal device 12, 19, an attachment corresponding to the URL, and therefore it is possible to reliably transmit the attachment to the client terminal device 12, 19.

In the system 10, the first hash output value for a restricted attachment with a predetermined destination is compared to the second hash output value for a received attachment, and when these hash output values are equal, the attachment corresponding to the second hash output value is transmitted only to the predetermined destination, so that the highly confidential, restricted attachment desired to be limited in destination is not transmitted to any destination other than the predetermined destination, making it possible to maintain the confidentiality of the restricted attachment, thereby ensuring the security of the restricted attachment. In the system 10, separation of the mail body and the attachments makes it possible to reliably restrict the destination of the restricted attachment, thereby reliably preventing the restricted attachment from being transmitted to any destination other than the predetermined destination.

In the system 10, the second hash output value stored in the mail box 18 is sequentially compared to the second hash output values for transmitted attachments, and when these hash output values are equal, any subsequent attachment corresponding to the second hash output value is rejected to be transmitted, so that even if an attachment with the same contents is transmitted a plurality of times from a mail sender (an internal or external user), it is possible to prevent in advance unnecessary transmission of a plurality of attachments with the same contents, thereby preventing decrease in the memory space of the external server 13 due to storage of unnecessary attachments. In the system 10, separation of the mail body and the attachments makes it possible to reliably reject transmission of attachments with the same contents, thereby reliably preventing transmission of any subsequent attachment with the same contents.

In the system 10, a portion of the second hash output value for an attachment corresponding to a generated URL is appended to the URL, and therefore it is possible to make it difficult for any third party to decipher or copy any URL generated via the code generation means, thereby preventing unauthorized acquisition of the attachment by any third party.

In the system 10, a portion of the second hash output value for an attachment identical to a restricted attachment is appended to the URL corresponding to the attachment, and therefore it is possible to make it difficult for any third party to decipher or copy any URL appended to an attachment identical to a restricted attachment, thereby reliably preventing unauthorized acquisition of the restricted attachment by any third party.

In the system 10, because second hash output values stored in the mail box 18 are erased after a predetermined period of time since their storage, and attachments stored in the mail box 18 are erased as well after a predetermined period of time since their storage, it is possible to prevent overflow in the memory space of the management server 11 due to the second hash output values and the attachments. In the system 10, by erasing attachments after a predetermined period of time since their storage, it becomes possible to lower the possibility of leaking highly confidential attachments, thereby reducing the risk of unauthorized acquisition of highly confidential attachments.

In the system 10, when a forcible separation identifier is being set for an attachment, the mail server 15 separates a mail body via the forcible separation means, along with the attachment, so that only a URL is transmitted to the external server 13, and therefore it is possible to conceal the mail body when it is desirable that not only the attachment but also the mail body be not disclosed, thereby improving the security protection of electronic mail. In the system 10, an attachment is allowed or disallowed to be transmitted based on its file format, and therefore it is possible to determine whether or not attachments in a specific file format are allowed to be transmitted based on the security protection level for that file format, thereby reliably maintaining the confidentiality of the attachments. In this system 10, it is possible to determine whether or not attachments in a specific encryption file format are allowed to be transmitted based on the security level for that file format, thereby reliably maintaining the confidentiality of encrypted attachments. In the system 10, it is possible to determine whether or not attachments are allowed to be transmitted based on their size, and therefore it is possible to prevent the memory space of the server 13 from decreasing due to large-sized attachments being transmitted to the external server 13.

In the system 10, because predetermined attachments are transmitted only within a period in which transmission is allowed, and transmission of the attachments is rejected after the period in which transmission is allowed, it is possible to lower the possibility of leaking highly confidential attachments by limiting the attachments so as to be disclosed only during a predetermined period of time, thereby reducing the risk of unauthorized acquisition of highly confidential attachments. In the system 10, the period in which attachments are allowed to be transmitted can also be set based on the file formats of the attachments, and therefore it is possible to determine the length of the period in which transmission is allowed based on the security protection level for the file formats, thereby reliably maintaining the confidentiality of the attachments.

In the system 10, transmission of a predetermined attachment is delayed until arrival of the period in which the attachment is allowed to be transmitted, so that the attachment is transmitted to the client terminal device 12 or the external server 13 after arrival of the period in which it is allowed to be transmitted, and therefore when the attachment turns out to be highly confidential data during that delay period, it is possible to stop transmitting the attachment to the client terminal device 12, 19, thereby reliably maintaining the confidentiality of the attachment. In the system 10, the transmission delay period of the attachment can also be set based on the file format of the attachment, and therefore it is possible to determine the length of the transmission delay period based on the security protection level for the file format, thereby reliably maintaining the confidentiality of the attachment.

In the system 10, because the management server 11 requests the client terminal device 12 or the external server 13 to perform the authorization procedure for authorizing transfer and transmission of an attachment, and the attachment is transferred or transmitted only to the client terminal device 12 or the external server 13 that has been authorized by the management server 11, it is possible to prevent the attachment from being viewed by any users other than legitimate system users who have been authorized. In the system 10, the client terminal device 12 or the external server 13 is caused to execute the authorization procedure, and therefore it is possible to lower the possibility of leaking highly confidential attachments, thereby reducing the risk of unauthorized acquisition of highly confidential attachments.

The invention claimed is:

1. An electronic mail transmission/reception system comprising a first server device capable of transmitting/receiving via a network electronic mail composed of a mail body and an attachment added to the mail body, wherein, the first server device includes: first conversion means for hashing a destination restricted attachment intended for a predetermined destination for which a destination restriction identifier indicating its destination is set by a one-way hash function, and converting the destination restricted attachment into a first hash output value; first storage means for storing the first hash output value for the destination restricted attachment converted via the first conversion means; second conversion means for hashing a received attachment other than the destination restricted attachment by the one-way hash function, and converting the attachment into a second hash output value;

second storage means for storing the second hash output value for the attachment converted via the second conversion means; and destination restriction means for comparing the first hash output value with the second hash output value, and when these hash output values are equal, determining that the attachment corresponding to the second hash output value is identical to a destination restricted attachment corresponding to the first hash output value and transmitting the attachment corresponding to the second hash output value only to a destination indicated by the destination restriction identifier based on the destination restriction identifier set for the destination restricted attachment, wherein the first server compares the first hash output value with the second hash output value, and when these hash output values are different, determines that the attachment corresponding to the second hash output value is different from the destination restricted attachment corresponding to the first hash output value and transmits the attachment corresponding to the second hash output value to the destination indicated by the attachment.

2. The electronic mail transmission/reception system according to claim 1, wherein the first server device includes: second storage means for storing the second hash output value for the attachment converted via the second conversion means; and transmission rejection means for sequentially comparing the second hash output value stored via the second storage means to the second hash output value for the attachment converted via the second conversion means, and when these hash output values are equal, refusing transmission of any subsequent attachment corresponding to the second hash output value.

3. The electronic mail transmission/reception system according to claim 1, wherein, the first server device includes: electronic mail separation means for separating the received electronic mail into the mail body and the attachment; third storage means for independently storing the mail body and the attachment separated via the electronic mail separation means; code generation means for generating a transmission request code for use by a predetermined client terminal device to request the first server device to transmit the attachment; and code appending means for appending to the mail body the transmission request code for the attachment corresponding to the mail body, and the client terminal device in the electronic mail transmission/reception system uses the transmission request code to request the first server device to transmit the attachment, so that the first server device transmits to the client terminal device the attachment corresponding to the transmission request code.

4. The electronic mail transmission/reception system according to claim 3, comprising a second server device capable of transmitting/receiving electronic mail to/from the first server device via the network, wherein, the first server device includes mail body transmission means for transmitting to the second server device the mail body having the transmission request code appended thereto, and the client terminal device connected to the second server device in the electronic mail transmission/reception system uses the transmission request code to request the first server device to transmit the attachment, so that the first server device transmits the attachment corresponding to the transmission request code to the client terminal device connected to the second server device.

5. The electronic mail transmission/reception system according to claim 3, wherein the code generation means appends to the generated transmission request code a portion of the second hash output value for the attachment corresponding to the transmission request code.

6. The electronic mail transmission/reception system according to claim 2, wherein the first server device erases the stored second hash output value and the stored attachment after a predetermined period of time since their storage.

7. The electronic mail transmission/reception system according to claim 3, wherein the first server device, when requested by the client terminal device to transmit the attachment, requests the client terminal device to perform an authorization procedure for authorizing transmission of the attachment.

8. The electronic mail transmission/reception system according to claim 2, wherein, the first server device includes: electronic mail separation means for separating the received electronic mail into the mail body and the attachment; third storage means for independently storing the mail body and the attachment separated via the electronic mail separation means; code generation means for generating a transmission request code for use by a predetermined client terminal device to request the first server device to transmit the attachment; and code appending means for appending to the mail body the transmission request code for the attachment corresponding to the mail body, and the client terminal device in the electronic mail transmission/reception system uses the transmission request code to request the first server device to transmit the attachment, so that the first server device transmits to the client terminal device the attachment corresponding to the transmission request code.

9. The electronic mail transmission/reception system according to claim 4, wherein the code generation means appends to the generated transmission request code a portion of the second hash output value for the attachment corresponding to the transmission request code.

10. The electronic mail transmission/reception system according to claim 3, wherein the first server device erases the stored second hash output value and the stored attachment after a predetermined period of time since their storage.

11. The electronic mail transmission/reception system according to claim 4, wherein the first server device erases the stored second hash output value and the stored attachment after a predetermined period of time since their storage.

12. The electronic mail transmission/reception system according to claim 5, wherein the first server device erases the stored second hash output value and the stored attachment after a predetermined period of time since their storage.

13. The electronic mail transmission/reception system according to claim 4, wherein the first server device, when requested by the client terminal device to transmit the attachment, requests the client terminal device to perform an authorization procedure for authorizing transmission of the attachment.

14. The electronic mail transmission/reception system according to claim 5, wherein the first server device, when requested by the client terminal device to transmit the attachment, requests the client terminal device to perform an authorization procedure for authorizing transmission of the attachment.

15. The electronic mail transmission/reception system according to claim 6, wherein the first server device, when requested by the client terminal device to transmit the attachment, requests the client terminal device to perform an authorization procedure for authorizing transmission of the attachment.

* * * * *